United States Patent
Hoffmann

(10) Patent No.: US 10,804,827 B2
(45) Date of Patent: Oct. 13, 2020

(54) CLOSED-LOOP-CONTROLLED VOLTAGE GENERATING APPARATUS AND METHOD FOR OPERATING A CLOSED-LOOP-CONTROLLED VOLTAGE GENERATING APPARATUS

(71) Applicant: SIEMENS MOBILITY GMBH, Munich (DE)

(72) Inventor: Wolfgang Hoffmann, Erlangen (DE)

(73) Assignee: Siemens Mobility GmbH, Munich (DE)

( * ) Notice: Subject to any disclaimer, the term of this patent is extended or adjusted under 35 U.S.C. 154(b) by 0 days.

(21) Appl. No.: 16/483,131

(22) PCT Filed: Dec. 21, 2017

(86) PCT No.: PCT/EP2017/084005
§ 371 (c)(1),
(2) Date: Aug. 2, 2019

(87) PCT Pub. No.: WO2018/141463
PCT Pub. Date: Aug. 9, 2018

(65) Prior Publication Data
US 2020/0044589 A1 Feb. 6, 2020

(30) Foreign Application Priority Data

Feb. 2, 2017 (DE) .......... 10 2017 201 687

(51) Int. Cl.
*H02P 9/14* (2006.01)
*F02B 63/04* (2006.01)

(52) U.S. Cl.
CPC .............. *H02P 9/14* (2013.01); *F02B 63/042* (2013.01)

(58) Field of Classification Search
CPC .................................. H02P 9/14; F02B 63/042
USPC .................................. 322/23, 27, 28, 37, 47
See application file for complete search history.

(56) References Cited

U.S. PATENT DOCUMENTS

| | | | | |
|---|---|---|---|---|
| 3,768,002 A | * | 10/1973 | Drexler ................. | H02K 19/30 322/25 |
| 4,031,407 A | * | 6/1977 | Reed ..................... | H02J 3/42 307/87 |
| 4,536,126 A | * | 8/1985 | Reuther ................ | H02J 3/42 290/40 R |
| 4,553,516 A | | 11/1985 | Hasegawa | |

(Continued)

FOREIGN PATENT DOCUMENTS

DE 3407209 A1 8/1984
DE 19632891 A1 2/1998
(Continued)

*Primary Examiner* — Pedro J Cuevas
(74) *Attorney, Agent, or Firm* — Laurence Greenberg; Werner Stemer; Ralph Locher

(57) ABSTRACT

A controllable voltage-generating apparatus includes a mechanically driven, separately excited generator. An electric output voltage of the generator is rectified by a rectifier. The voltage-generating apparatus can be controlled by a control system. A voltage-control device of the control system has a calculation device, by way of which an electric excitation signal for the generator can be calculated by way of a defined interpolation from measurement values of the electric excitation signals of the voltage-generating apparatus.

4 Claims, 3 Drawing Sheets

(56) References Cited

U.S. PATENT DOCUMENTS

| | | | | |
|---|---|---|---|---|
| 4,723,106 A * | 2/1988 | Gibbs | H02P 9/36 | 322/26 |
| 4,967,097 A * | 10/1990 | Mehl | H02P 9/307 | 290/4 C |
| 4,977,529 A * | 12/1990 | Gregg | G05B 17/02 | 376/245 |
| 5,055,765 A * | 10/1991 | Rozman | F02N 11/04 | 322/22 |
| 5,068,590 A * | 11/1991 | Glennon | F02N 11/04 | 290/38 R |
| 5,097,195 A * | 3/1992 | Raad | F02N 11/04 | 290/38 R |
| 5,430,362 A * | 7/1995 | Carr | F02N 11/04 | 318/139 |
| 5,488,286 A * | 1/1996 | Rozman | F02N 11/04 | 290/46 |
| 5,493,200 A * | 2/1996 | Rozman | H02P 9/08 | 322/10 |
| 5,594,322 A * | 1/1997 | Rozman | F02N 11/04 | 318/400.12 |
| 5,929,612 A * | 7/1999 | Eisenhaure | H02P 9/102 | 290/8 |
| 6,300,746 B1 | 10/2001 | Mueller et al. | | |
| 6,707,275 B2 * | 3/2004 | Okahara | H02J 7/24 | 322/24 |
| 6,900,618 B2 * | 5/2005 | Maehara | H02J 7/163 | 322/28 |
| 6,998,726 B2 * | 2/2006 | Sarlioglu | F02N 11/0859 | 290/31 |
| 7,071,656 B2 * | 7/2006 | Taniguchi | H02P 9/006 | 322/28 |
| 7,081,725 B2 * | 7/2006 | Seely | B60L 50/50 | 318/139 |
| 7,294,991 B2 * | 11/2007 | Kimura | F02D 29/02 | 322/37 |
| 7,309,974 B2 * | 12/2007 | Sarlioglu | F01D 15/10 | 290/4 D |
| 7,355,367 B2 * | 4/2008 | Sarlioglu | F01D 15/10 | 290/4 D |
| 7,394,227 B2 * | 7/2008 | Uematsu | H02P 9/48 | 322/27 |
| 7,423,351 B2 * | 9/2008 | Maehara | H02P 9/48 | 290/40 C |
| 7,592,785 B2 * | 9/2009 | Kimura | B60L 15/025 | 322/28 |
| 8,022,677 B2 | 9/2011 | Laufenberg et al. | | |
| 8,299,762 B2 * | 10/2012 | Rozman | H02M 3/156 | 318/801 |
| 8,378,641 B2 * | 2/2013 | Rozman | H02J 3/36 | 322/24 |
| 8,427,116 B2 * | 4/2013 | Rozman | H02M 3/156 | 322/37 |
| 8,541,988 B2 * | 9/2013 | Horihata | H02J 7/1461 | 322/21 |
| 8,773,081 B2 * | 7/2014 | Akita | H02P 9/305 | 322/22 |
| 8,847,558 B2 | 9/2014 | Schmidt | | |
| 8,975,876 B2 * | 3/2015 | Rozman | H02P 9/305 | 322/28 |
| 9,209,741 B2 * | 12/2015 | Gao | F02N 11/04 | |
| 9,325,229 B2 * | 4/2016 | Rozman | H02P 9/48 | |
| 9,431,943 B2 * | 8/2016 | Moreau | H02P 9/14 | |
| 9,548,691 B1 * | 1/2017 | Rozman | H02P 9/48 | |
| 9,590,545 B2 * | 3/2017 | Frampton | H02P 9/00 | |
| 9,660,563 B2 * | 5/2017 | Rozman | H02P 9/007 | |
| 9,716,456 B2 * | 7/2017 | Maruyama | H02J 7/163 | |
| 9,935,571 B2 * | 4/2018 | Frampton | H02P 9/14 | |
| 9,998,045 B2 * | 6/2018 | Frampton | H02P 9/009 | |
| 10,205,415 B2 * | 2/2019 | Blackwelder | H02P 9/14 | |
| 10,256,758 B2 * | 4/2019 | Frampton | H02K 3/26 | |
| 10,263,553 B2 * | 4/2019 | Blackwelder | H02P 9/105 | |
| 10,498,275 B2 * | 12/2019 | Blackwelder | H02P 9/08 | |
| 2002/0027426 A1 * | 3/2002 | Okahara | H03K 17/166 | 322/28 |
| 2003/0075997 A1 | 4/2003 | Keim et al. | | |
| 2003/0178973 A1 * | 9/2003 | Maehara | H02J 7/24 | 322/27 |
| 2004/0108726 A1 * | 6/2004 | Sarlioglu | F02N 11/0859 | 290/38 R |
| 2007/0085512 A1 | 4/2007 | Maehara | | |
| 2007/0102935 A1 * | 5/2007 | Sarlioglu | H02P 25/08 | 290/52 |
| 2007/0268005 A1 * | 11/2007 | Sarlioglu | H02P 9/302 | 322/47 |
| 2008/0186000 A1 * | 8/2008 | Kimura | B60L 15/025 | 322/23 |
| 2008/0191482 A1 * | 8/2008 | Okuno | H02P 9/48 | 290/7 |
| 2008/0303490 A1 * | 12/2008 | Xu | H02K 17/44 | 322/29 |
| 2010/0308582 A1 * | 12/2010 | Rozman | H02P 25/024 | 290/31 |
| 2011/0260698 A1 | 10/2011 | Peuser et al. | | |
| 2012/0007428 A1 * | 1/2012 | Rozman | H02P 1/52 | 307/66 |
| 2012/0007568 A1 * | 1/2012 | Horihata | H02J 7/1461 | 322/21 |
| 2012/0146593 A1 * | 6/2012 | Akita | H02P 9/48 | 322/10 |
| 2012/0153904 A1 * | 6/2012 | Albsmeier | H02P 9/302 | 322/28 |
| 2013/0033038 A1 * | 2/2013 | Rozman | H02P 9/102 | 290/31 |
| 2013/0313828 A1 * | 11/2013 | Moreau | H02P 9/08 | 290/44 |
| 2014/0265744 A1 * | 9/2014 | Rozman | H02K 19/365 | 310/68 D |
| 2014/0266078 A1 * | 9/2014 | Rozman | H02P 9/02 | 322/27 |
| 2015/0229248 A1 * | 8/2015 | Richards | H02P 6/06 | 60/605.1 |
| 2015/0244303 A1 * | 8/2015 | Gao | H02P 31/00 | 290/32 |
| 2015/0311848 A1 * | 10/2015 | Maruyama | H02P 9/48 | 318/490 |
| 2016/0149527 A1 * | 5/2016 | Frampton | H02P 9/00 | 322/17 |
| 2016/0149528 A1 * | 5/2016 | Frampton | H02P 9/14 | 322/20 |
| 2016/0268942 A1 * | 9/2016 | Rozman | H02K 21/042 | |
| 2016/0301345 A1 * | 10/2016 | Frampton | H02P 9/04 | |
| 2016/0373038 A1 * | 12/2016 | Rozman | H02P 9/305 | |
| 2017/0170762 A1 * | 6/2017 | Blackwelder | H02P 6/20 | |
| 2017/0170764 A1 * | 6/2017 | Blackwelder | H02P 6/20 | |
| 2017/0170765 A1 * | 6/2017 | Blackwelder | H02P 9/08 | |
| 2018/0131301 A1 * | 5/2018 | Frampton | H02K 7/1815 | |
| 2018/0131302 A1 * | 5/2018 | Frampton | H02P 9/00 | |
| 2019/0173403 A1 * | 6/2019 | Blackwelder | H02J 3/40 | |
| 2019/0190418 A1 * | 6/2019 | Frampton | H02P 9/48 | |
| 2019/0207542 A1 * | 7/2019 | Blackwelder | H02P 9/14 | |

FOREIGN PATENT DOCUMENTS

| | | |
|---|---|---|
| DE | 19733221 A1 | 2/1999 |
| DE | 10361215 A1 | 7/2005 |
| DE | 102008043509 A1 | 5/2010 |
| DE | 102010040863 A1 | 3/2012 |
| DE | 102012223516 A1 | 3/2014 |
| EP | 1063764 A2 | 12/2000 |
| FR | 2948512 A1 | 1/2011 |
| JP | 2011223762 A | 11/2011 |

\* cited by examiner

CLOSED-LOOP-CONTROLLED VOLTAGE GENERATING APPARATUS AND METHOD FOR OPERATING A CLOSED-LOOP-CONTROLLED VOLTAGE GENERATING APPARATUS

The invention relates to a closed-loop-controlled voltage generating apparatus and a method for operating such an apparatus.

BACKGROUND OF THE INVENTION

Field of the Invention

Closed-loop-controlled voltage generating apparatuses for generating a voltage for consumers are known. Here, use is made of voltage controllers and current controllers, with load variations being able to be taken account of by means of a characteristic, parameters for the characteristic often only being obtainable with very much outlay, for example from data sheets of a generator involved.

SUMMARY OF THE INVENTION

It is an object of the present invention to provide an improved closed-loop-controlled voltage generating apparatus.

According to a first aspect, the object is achieved by a closed-loop-controlled voltage generating apparatus, comprising:
  a mechanically drivable, separately excited generator device;
  wherein an output voltage of the generator device is rectifiable by means of a rectifier device;
  wherein the voltage generating apparatus is closed-loop-controlled by means of a regulating apparatus;
  wherein a voltage regulating device of the regulating apparatus comprises an ascertainment device, by means of which an electric excitation signal for the generator device is ascertainable by means of a defined interpolation from measured values of the electric excitation signals of the voltage generating apparatus.

This can advantageously realize disturbance variable feedforward control, by means of which load changes of the voltage generating apparatus can be compensated dynamically. As a result, this does not require a complicated ascertainment of a characteristic of the ascertainment device using simulation technology. As a result, knowledge of parameters is not necessary for simulating the characteristic of the ascertainment device. All that needs to be done for ascertaining the excitation signals by measurement technology is to drive to working points that are driven to in any case during the operation of the voltage generating apparatus.

According to a second aspect, the object is achieved by a method for operating a closed-loop-controlled voltage generating apparatus comprising a mechanically driven, separately excited generator device and a rectifier device interconnected with the generator device, said method including the steps of:
  generating a rectified output voltage of the generator device;
  capturing an excitation signal of the generator device under defined boundary conditions using measurement technology; and
  mathematically ascertaining the electric excitation signal of the generator device by way of a defined interpolation from the excitation signals ascertained by means of measurement technology.

In this way, a mathematical ascertainment of the characteristic for the closed-loop-controlled voltage generating apparatus can advantageously be carried out on the basis of measurement data. Complicated model formation and simulation processes are advantageously not required as a result thereof.

A preferred embodiment of the apparatus according to the invention is distinguished in that the ascertainment device can be supplied with a calculated power value and a rotational speed setpoint value of the generator device, with a setpoint value of an electric excitation current for an exciter device of the generator device being ascertainable by means of the ascertainment device. As a result, the electric excitation signal can be ascertained with a high accuracy.

A further preferred embodiment of the voltage generating apparatus is distinguished in that the ascertainment device can be supplied with a calculated power value and a rotational speed setpoint value of the generator device, with a setpoint value of an excitation voltage for an exciter device of the generator device being ascertainable by means of the ascertainment device. In this way, little additional outlay is advantageously required for ascertaining the electric excitation signal in the form of the excitation voltage.

A further preferred embodiment of the voltage generating apparatus is distinguished in that the generator device is operable at at least two defined rotational speeds, in each case when idling and at rated load, wherein the value of the electric excitation current or of the excitation voltage is ascertainable from a linear interpolation of four value triples obtained thereby, wherein a value triple consists of excitation current or voltage, rotational speed and load. In this way, the excitation signal can be easily ascertained mathematically with little computational outlay.

A further preferred embodiment of the closed-loop-controlled voltage providing apparatus is distinguished in that the rotational speed range of the generator device is traversable at defined intervals for the purposes of ascertaining the value triples of the electric excitation current or excitation voltage. In this way, a rotational speed range of the generator device is driven through uniformly with a defined number of working points, as a result of which the electric excitation signal can be ascertained even more precisely.

A further preferred embodiment of the closed-loop-controlled voltage generating apparatus is distinguished in that a second setpoint value of the electric excitation current or of the excitation voltage, which forms a setpoint value of the electric excitation current or excitation voltage together with the first setpoint value, provided by the ascertainment device, of the electric excitation current or the excitation voltage, is ascertainable by means of an auxiliary regulating device, which can be supplied with a measured value of the output voltage of the rectifier device and a setpoint value of the output voltage of the rectifier device. In this way, the characteristic of the ascertainment device is finely adjusted by means of the auxiliary regulating device and hence an optimized value of the excitation signal is provided.

A further preferred embodiment of the voltage generating apparatus is distinguished in that the generator device is drivable by means of an internal combustion engine, wherein a rotational speed of the generator device can be set in defined fashion in each case by means of the internal combustion engine. In this way different rotational speeds for the generator device are provided in simple fashion.

A further preferred embodiment of the closed-loop-controlled voltage generating apparatus is distinguished in that the rated load can be set by a resistor at the output of the rectifier device. In this way, braking resistance of a traction motor can advantageously be exploited, and hence little additional outlay is required for driving to a defined working point of the voltage generating apparatus.

What is considered particularly advantageous in the case of the invention is that simple technical means render it possible to compensate load variations of the voltage generating apparatus in a simple manner. To this end, use need advantageously not be made of complicated additional devices; instead, driving to defined working points using measurement technology and ascertaining measured values for ascertaining the characteristic of an ascertainment device of the regulating apparatus using measurement technology are sufficient for ascertaining electric actuation signals (excitation current or excitation voltage).

The above-described properties, features and advantages of the invention and the manner in which these are achieved, will become clearer and more easily understandable in conjunction with the following description of the exemplary embodiments, which are explained in more detail in conjunction with the figures.

DESCRIPTION OF THE INVENTION

Figure 1:
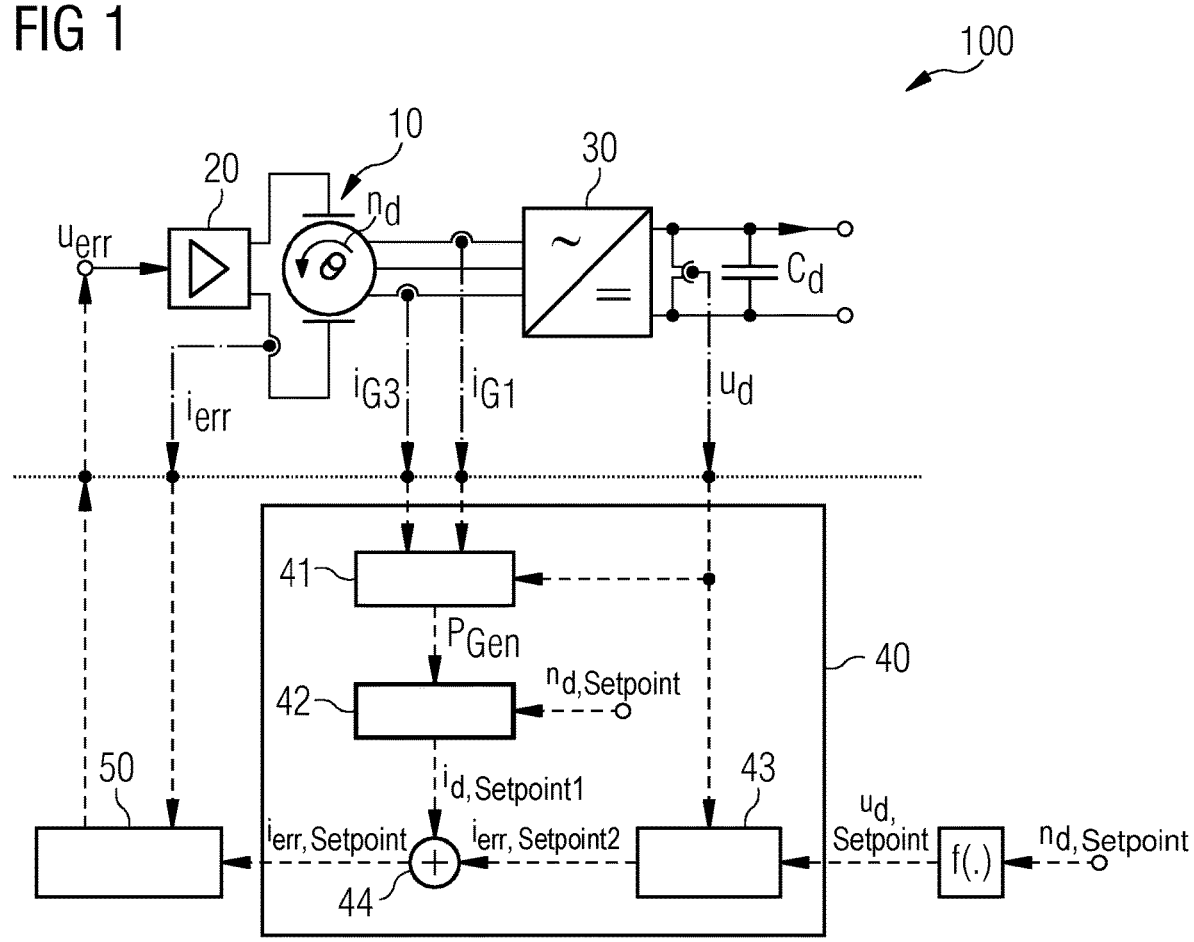
FIG. 1 shows a block diagram of a proposed voltage generating apparatus in basic representation.

FIG. 1 shows a basic block diagram of an embodiment of a closed-loop-controlled voltage generating apparatus 100. It is possible to identify a separately excited generator device 10 (e.g., in the form of a separately excited synchronous generator), which is electrically excited by means of an exciter device 20. A three-phase output voltage of the generator device 10 is supplied to a rectifier device 30, which is preferably in the form of a B6 bridge circuit. A rectified output voltage $u_d$ is available at the output of the rectifier device 30 at a DC link capacitor $C_d$, a load (not illustrated), for example in the form of an electrical traction motor of a locomotive, being connectable to said output voltage.

A regulating apparatus 40, 50 is identifiable in the lower section of FIG. 1, an excitation voltage $u_{err}$ being provided for the exciter device 20 by means of said regulating apparatus. It is possible to identify a voltage regulating device 40, which is functionally interconnected with a current regulating device 50. Measured current values $i_{G1}$, $i_{G3}$ of the generator device 10 and the output voltage $u_d$ of the rectifier device 30 are supplied to a calculation device 41 of the voltage regulating device 40. The calculation device 41 is used to ascertain a power $P_{Gen}$ of the generator device 10 by calculation. An output variable of the measured power value is supplied to an ascertainment device 42, which is also supplied with a rotational speed setpoint value $n_{d,Setpoint}$ of the generator device 10. In a way that is defined in more detail below, the ascertainment device 42 ascertains a first setpoint value of the excitation current $i_{err,Setpoint1}$ and supplies the latter to a summing point 44.

A second setpoint value $i_{err,Setpoint2}$ of the excitation current is also supplied to the summing point 44. Said second setpoint value is an output variable of an auxiliary regulating device 43, which ascertains the specified second setpoint value $i_{err,Setpoint2}$ from the output voltage $u_d$ of the rectifier device 30 and a setpoint value of the output voltage $u_{d,Setpoint}$ of the rectifier device 30 from a defined mapping of a rotational speed setpoint value $n_{d,Setpoint}$.

In this way, an output signal $i_{err,Setpoint}$ supplied from the voltage regulating device 40 to the current regulating device 50, the latter forming an electric actuation signal in the form of the excitation voltage $u_{err}$ for the exciter device 20 therefrom.

Conventionally, complicated simulations are necessary for realizing the ascertainment device 42, said simulations also requiring knowledge about the generator device 10 and various component parameters of various components from the entire voltage regulating apparatus 100. For this purpose, a dynamic model of the aforementioned controlled system is conventionally created on the basis of complex, nonlinear differential equations. Parameters of the model arise after intermediate calculations from specifications from the manufacturer and the system design. Simulations of the generator equations using simulation software are required at various non-specified working points, up to the respective steady-state condition. Here, the auxiliary regulating device 43 ensures that the relationship $u_{d,actual}=u_{d,Setpoint}$ is satisfied. From this, a node arises for each working point AP according to the following relationship:

$$i_{err}=f(P_{Gen},n_{d,Setpoint}) \quad (1)$$

$i_{err}$ ... excitation current
$P_{Gen}$ ... generator power
$n_{d,Setpoint}$ ... rotational speed setpoint value Subsequently, the parameters of a second order surface:

$$i_{Fläche}=x_0+x_{p1}*P_{Gen}+x_{p2}*P_{Gen}^2+x_{n1}*n_{d,Setpoint}+x_{n2}*n_{d,Setpoint2} \quad (2)$$

are optimized in such a way that the electric excitation current at the working points $i_{Fläche}$ deviates as little as possible from the excitation current $i_{err}$ at the working point as calculated by the simulation.

The explained surface equation in equation (2) and the associated parameters are conventionally implemented in control software.

The present invention proposes an ascertainment of a characteristic of the ascertainment device 42 in a simple manner on the basis of measured data.

To this end, provision is made for the voltage generating apparatus 100 to have to be driven to a defined, small number of working points. By way of example, it is sufficient to drive the voltage generating apparatus 100 to 8 to 10 working points, with a measured value of an excitation current $i_{err}$, depending on a defined rotational speed $n_d$ and a defined generator load $P_{Gen}$, being recorded at each working point in each case. Here, the working points comprise a rotational speed range of the generator device 10 in the region of approximately 600 to approximately 1800 rpm, with at least two different rotational speeds at the edges of the overall region being driven to.

A measured value of the excitation current ascertained thus can be input into the regulating apparatus as a parameter, as a result of which the ascertainment device 42 is defined in a simple manner.

Preferably, by setting defined rotational speeds of the generator device 10 (e.g., by means of a diesel generator set driving the generator device 10), M working points should be set to the following values:

$$n_{d,Setpoint} \text{ for } x \in [0 \ldots M-1]. \quad (3)$$

Here, the auxiliary regulating device 43 ensures the following applies:

$$u_{d,actual} = u_{d,Setpoint} \quad (4)$$

where:

$u_{d,ist}$ . . . actual value of the DC link voltage $u_{d,Setpoint}$ . . . Setpoint value of the DC link voltage The electric excitation current $i_{err}$ is measured in a stationary state in each case, once in the case without load (idling) and once at the rated load. In order to set the rated load, an adjustable ohmic resistor (not illustrated), for example in the form of a braking resistor of a traction motor employed during regular operation of the voltage generating apparatus 100, is set in suitable fashion at the output of the rectifier device 30.

As a result, 2M parameter sets or value triples or numerical triples t arise; these can be input directly into the ascertainment device 42.

Figure 2:
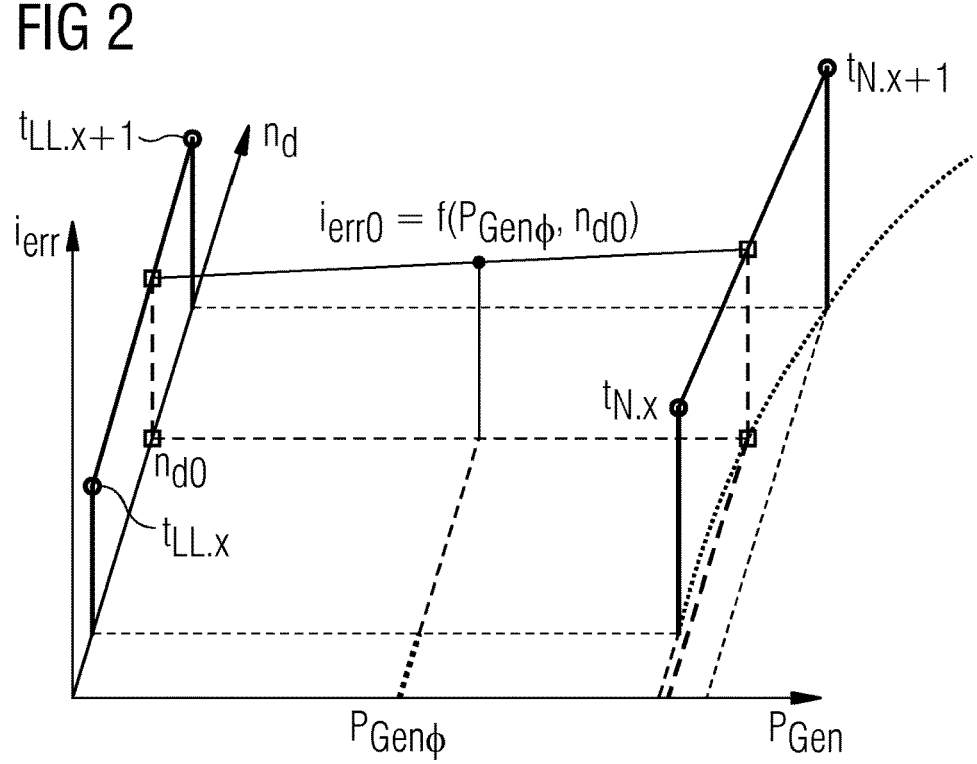
FIG. 2 shows a basic scheme for ascertaining the electric excitation current according to the proposed principle.

FIG. 2 shows a basic illustration of the ascertainment principle, explained above, for the electric excitation current $i_{err}$. It is possible to identify a three-axis Cartesian coordinate system, having the axes of generator power $P_{Gen}$, electric excitation current $i_{err}$ and rotational speed $n_d$.

It is possible to identify that, respectively for the values of idling and rated load, value triples t are ascertained for the specified values, as a result of which four of the aforementioned value triples t arise in each case, wherein an electric excitation current emerges per value triple t, depending on a defined power and a defined rotational speed of the generator device 10. The first setpoint value of the electric excitation current $i_{err,Setpoint1}$ is ascertained by linear interpolation from four adjacent, ascertained value triples $t_{LL,x}$, $t_{LL,x+1}$, $t_{N,x}$, $t_{N,x+1}$, with the following value triples:

$t_{LL,x}$ . . . $n_{d,setpoint,x}$, $i_{err,LL,x}$, $P_{Gen}$ at a working point X during idling $t_{LL,x+1}$ . . . $n_{d,setpoint,x+1}$, $i_{err,LL,x+1}$, $P_{Gen}$ at a working point X+1 during idling $t_{N,x}$ . . . $n_{d,setpoint,x}$, $i_{err,N,x}$, $P_{Gen}$ at a working point X at rated load $t_{N,x+1}$ . . . $n_{d,setpoint,x+1}$, $i_{err,N,x+1}$, $P_{Gen}$ at a working point X+1 at rated load As a result, the totality of the value triples t consequently represents a surface in space, wherein each point of the surface represents a first setpoint value of the electric excitation current $i_{err}$ depending on a defined generator power and a defined rotational speed.

This realizes a mathematical function that maps a power value and a rotational speed value of the voltage generating apparatus 100 to a value of the electric excitation current $i_{err}$ for the exciter device 20 of the generator device 10. A level of a surface point or a node of the surface in space corresponds to a specific value of a first setpoint value of the electric excitation current $i_{err,\,Setpoint1}$ in this case. Here, the rotational speed of the generator device 10 is controlled by a control device (not illustrated) of the generator device 10, with a diesel injection amount for a diesel generator set being metered accordingly, for example.

A characteristic for the ascertainment device 42 can be provided in a simple manner in this way, with associated interpolation algorithms being able to be implemented in a simple manner in the regulating apparatus, preferably in the form of software with suitable program code means.

Figure 3:
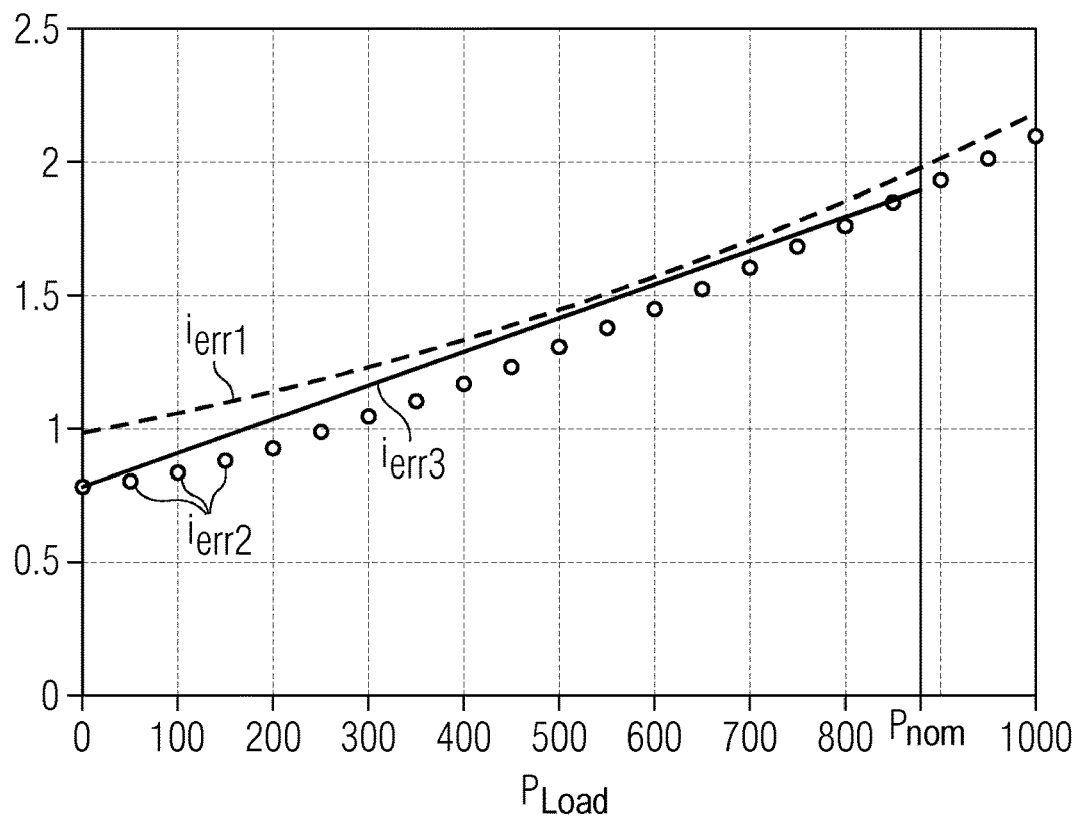
FIG. 3 shows a physical meaning of a functionality of the proposed method in basic representation.

FIG. 3 shows a diagram with a physical background of the present invention. The explanations below relate to a fixed generator rotational speed.

FIG. 3 shows three profiles of the electric excitation current $i_{err1}$, $i_{err2}$, $i_{err3}$, which is required at a certain load to keep the DC link voltage $u_d$ at a setpoint value. Conventionally, the profile $i_{err1}$ is obtained by forming a model and subsequently simulating the generator device 10.

$i_{err2}$ represents measured points of the electric excitation current with the same generator device 10, which current was measured with much outlay at many working points, with the shown relationships between load and excitation current arising.

$i_{err3}$ shows a characteristic for specific rotational speed, formed according to the invention. Upon startup, the generator device 10 is loaded in any case with the rated load $P_N$ within the scope of the so-called "Self Load Test".

Thus, it is possible to identify that the straight line according to $i_{err3}$, as proposed according to the invention, represents a sufficiently precise map of the real physical conditions according to $i_{err2}$. Here, it is possible to identify that the straight line of the electric excitation current according to $i_{err3}$, obtained by interpolation, even reflects reality better than the parabolic characteristic of the excitation current according to $i_{err1}$, which was determined with much outlay in conventional fashion.

The physical relationships illustrated in FIG. 3 thus show that a linear interpolation of the required electric excitation current $i_{err}$ between full load and idling leads to higher accuracy than the model formation with simulations, which was carried out with much outlay in conventional fashion. The linear interpolation of the excitation current $i_{err3}$ does not deviate from the real (measured) value by more than approximately 10% for any load. Advantageously, the described behavior is exhibited at all measured rotational speeds.

The load changes of the generator device 10 between idling and rated load must be compensated "quickly", i.e., with a frequency in the kHz range, since the aforementioned load changes are represented by electric time constants. This is ensured by the characteristic.

The auxiliary regulating device 43 does not suffice to this end. Compared thereto, the rotational speed changes of the generator device 10 are comparatively "slow", i.e., with a change frequency of approximately 10 Hz, as these are represented by a mechanical time constant. Inaccuracies in the ascertainment by calculation of the electrical excitation current $i_{err}$ between the rotational speed nodes can therefore easily be compensated by the superposed auxiliary regulating device 43 on account of its dynamic response. Consequently, the auxiliary regulating device 43 is fast enough to dynamically track or compensate the changes in rotational speed, which tend to be slow.

Advantageously, an operation of a voltage generating apparatus, in which the generator device 10 is unknown in terms of its technical properties and the conventionally required manufacturer specifications are not obtainable or not obtainable with appropriate outlay, can be realized by means of the invention.

In an alternative embodiment, the excitation voltage $u_{err}$, too, can be calculated by means of a characteristic of the ascertainment device 42 instead of the electrical excitation current $i_{err}$.

Figure 4:
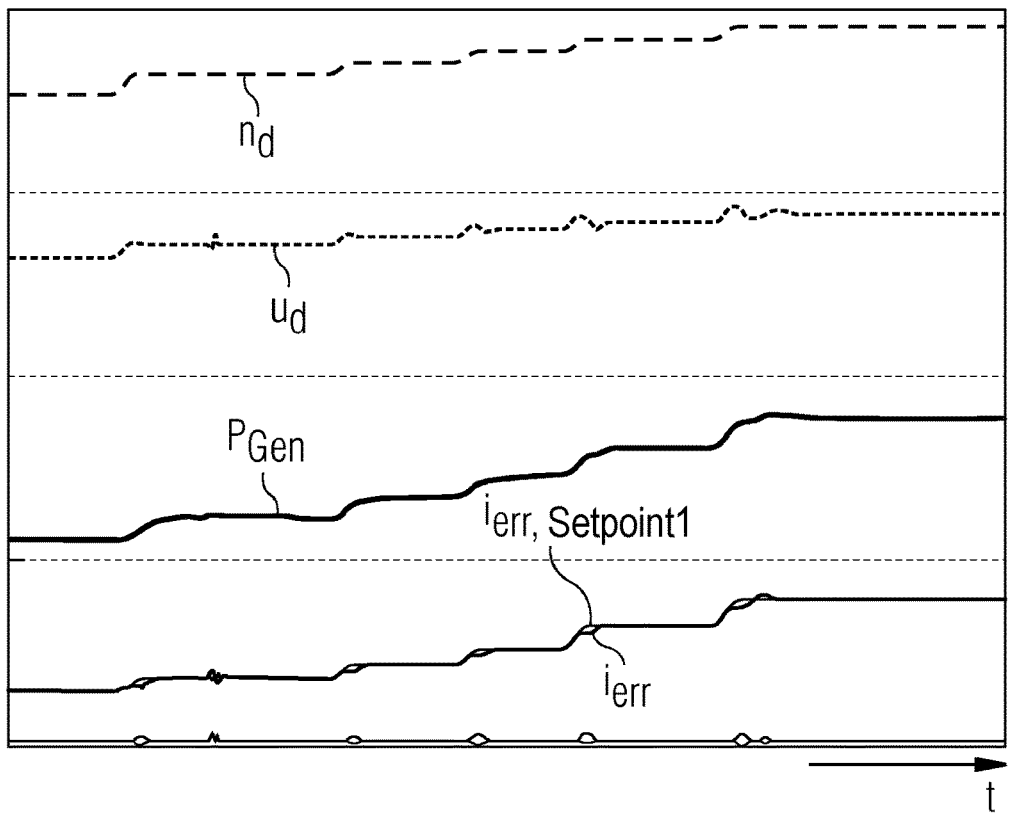
FIG. 4 shows different measured values of an embodiment of the proposed closed-loop-controlled voltage generating apparatus.

FIG. 4 shows a plurality of time profiles with measurement results after application of the proposed method.

The uppermost profile in FIG. 4 shows a time profile of the rotational speed $n_d$ of the generator device 10.

The second profile from the top in FIG. 4 shows a time profile of the DC link voltage $u_d$.

The third profile from the top in FIG. 4 shows a time profile of the generator power $P_{Gen}$.

The first setpoint value of the excitation current $i_{err, Setpoint1}$, ascertained by means of the characteristic of the ascertainment device 42, in the lowermost profile of FIG. 4 corresponds to the required stationary setpoint value of the electric excitation current $i_{err,Setpoint}$ to such a great extent that a superposed controller in the form of the auxiliary regulating device 43 ("feedback controller") hardly needs to carry out corrections.

Advantageously, the number of parameters required to represent the ascertainment device 42 is very low, with the measurement being implemented at working points that are driven to in any case when starting up the voltage generating apparatus 100. As a result of this, no off-site engineering is required prior to or during a starting-up project and, advantageously, no specifications (e.g., from the manufacturer) about the generator device 10 are necessary either.

As a result, there is advantageously no need to keep available the necessary expert knowledge and software licenses. Therefore, in principle, a completely unknown generator device 10 can be put into operation.

The measured parameters can be adopted directly into the software without intermediate calculations.

The parameters have physical meaning and can therefore be adapted to possible requirements in situ.

Control software is slimmed down and easier to read and maintain.

Advantageously, the method according to the invention can be implemented as software, which is executed on a microcomputer of the regulating apparatus. Such an implementation advantageously renders possible a simple modification or adaptation of the method according to the invention.

Figure 5:
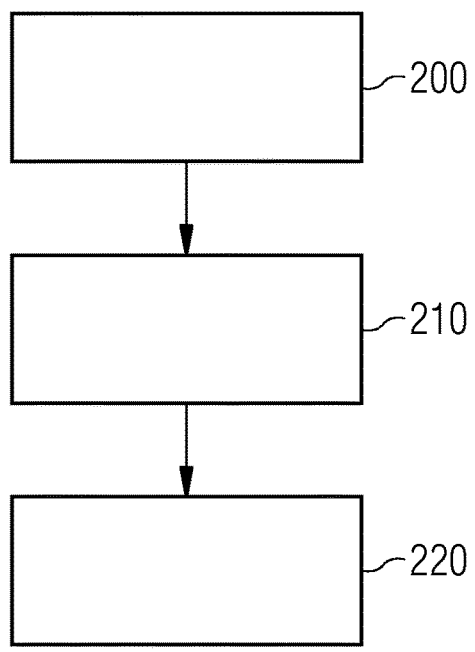
FIG. 5 shows a basic procedure of an embodiment of the method according to the invention.

FIG. 5 shows a basic flowchart of an embodiment of the method according to the invention for operating a voltage generating apparatus 100 comprising a mechanically driven, separately excited generator device 10 and a rectifier device 30 interconnected with the generator device 10.

In a step 200, generating a rectified output voltage of the generator device 10 is carried out.

In a step 210, capturing an excitation signal of the generator device 10 under defined boundary conditions is carried out using measurement technology.

In a step 220, mathematically ascertaining the electric excitation signal of the generator device 10 is carried out by way of a defined interpolation from the excitation signals ascertained by means of measurement technology.

In conclusion, the present invention achieves a measured data-based realization of a closed-loop-controlled voltage source with a separately excited synchronous generator and a rectifier bridge, which advantageously facilitates a highly dynamic compensation of different loads in a simple manner.

Even though the invention was illustrated and described more closely in detail by preferred exemplary embodiments, the invention is not restricted by the disclosed examples and other variations can be derived therefrom by a person skilled in the art without departing from the scope of protection of the invention.

The invention claimed is:

1. A closed-loop-controlled voltage generating apparatus, comprising:
    a mechanically driven, separately excited generator;
    an exciter for electrically exciting said generator;
    a rectifier connected to said generator and configured to rectify an an output voltage of said generator;
    a regulating apparatus configured to provide an excitation voltage ($u_{err}$) for said exciter, said regulating apparatus including a voltage regulator and a current regulator, said voltage regulator being functionally interconnected with said current regulator;
    said voltage regulator including a calculation device, an ascertainment device, an auxiliary regulator, and a summing point;
    said calculation device of said voltage regulator being configured to receive measured current values of output currents of the generator and an output voltage of said rectifier, to calculate a power of said generator and supplying the power to said ascertainment device as output variable of a measured power value;
    said ascertainment device further receiving a rotational speed setpoint value of the generator, ascertaining a first setpoint value of the excitation current and supplying the first setpoint value to said summing point;
    said auxiliary regulator being configured to ascertain a second setpoint value of the excitation current from the output voltage of said rectifier and a setpoint value of the output voltage of said rectifier from a defined mapping of a rotational speed setpoint value;
    said summing point receiving the first setpoint value and the second setpoint value of the excitation current, the second setpoint value being an output variable of said auxiliary regulator;
    said summing point being configured to form an output signal of said voltage regulator by summation, said output signal being supplied to said current regulator, and said current regulator forming therefrom an electric actuation signal being the excitation voltage for said exciter; and
    wherein said generator is operated at at least two defined rotational speeds, respectively when idling and at rated load, wherein a value of the excitation voltage is ascertained from a linear interpolation of four value triples obtained thereby, a value triple consisting of the excitation current, the rotational speed, and the load.

2. The voltage generating apparatus according to claim 1, wherein a rotational speed range of said generator is traversed at defined intervals for ascertaining the value triples of the excitation voltage.

3. The voltage generating apparatus according to claim 1, wherein said generator is driven by an internal combustion engine, and wherein a rotational speed of said generator is defined by way of the internal combustion engine.

4. The voltage generating apparatus according to claim 1, wherein the rated load is set by a resistor connected at an output of said rectifier.

* * * * *